UNITED STATES PATENT OFFICE.

HEINRICH CARL BUER, OF BONN, GERMANY.

BUTTER-FLAVORING.

1,014,690.

No Drawing.

Specification of Letters Patent.   Patented Jan. 16, 1912.

Application filed August 21, 1909.  Serial No. 514,040.

*To all whom it may concern:*

Be it known that I, HEINRICH CARL BUER, a doctor of philosophy, a citizen of the German Empire, residing at 31 Koenigstrasse, Bonn, Germany, have invented new and useful Improvements in Butter-Flavoring, of which the following is a specification.

The present invention relates to a process for the preparation of a flavoring emulsion of lecithin.

Butter fat naturally contains always a small proportion of lecithin which is emulsified in very fine division. During the ripening of the cream, that is during the natural acidulation at a temperature of between twelve and fifteen degrees centigrade, there are, as is well known, formed by decomposition of the lecithin of the cream, certain aromatic bodies. If therefore lecithin be added to the cream its natural content in lecithin will be correspondingly increased and in this manner we can also improve cream which naturally contains only very small quantities of lecithin. If, however, there be added to the cream only small quantities of lecithin, namely from 1 to 5 per cent., it is impossible to intermingle the lecithin which possesses a tough, waxy consistency, sufficiently finely throughout the cream; in other words it is impossible to emulsify the lecithin so finely that each little fatty particle of the cream is intimately mingled with the lecithin. In consequence, of this the formation of the flavor is also very restricted. If, for instance, use be made of a cream to which only small quantities of lecithin are added for the flavoring of food, for instance as an addition to artificial fat, then there is obtained only a very slight effect because owing to the imperfect distribution of the lecithin through the cream this latter, on being added to the artificial food fats also attains a uniform homogeneous admixture, that is to say such a mixture that each very small particle of fat of the artificial nutritive fat is intimately mingled with the decomposition products of the lecithin in the cream. This is, however, unconditionally necessary if a good reaction is to be attained and consequently a practically useful application of lecithin flavoring is to be produced.

The process hereinafter described which is the subject of the present application for a patent, renders possible the production of an emulsion of cream with an increased percentage of lecithin in which the lecithin is just as finely distributed as in natural cream. If such an emulsion be uniformly and homogeneously mixed with the food stuffs to be flavored, as for instance with artificial butter, then a far more distinct and stronger flavor is developed than on the mixing with natural cream poor in lecithin.

The operation is as follows: There is added to about 100 parts of lecithin, say 50 parts of fresh, sweet non-sterilized cream and it is endeavored to mix the two by vigorous agitation. After the mixing has lasted from 10 to 15 minutes further 50 parts of cream are added and the mixture is again agitated from 10 to 15 minutes. Then there are added from 50 to 75 parts of cream again and it is agitated again for from 10 to 15 minutes. Only in this manner, that is to say, by the gradual addition of small quantities of cream and long continued vigorous agitation can a complete solution of the lecithin in the cream be attained, because the lecithin is a tough, waxy substance and therefore can only be dissolved with great difficulty. If, on the other hand, only very small quantities of lecithin are added to the cream, for instance from 1 to 5 per cent., then a fine division cannot be obtained. On the other hand by means of the above process a completely homogeneous emulsion of the appearance of a mayonnaise is obtained in which the lecithin is quite as finely distributed as in natural cream. The emulsion consists of about 40 parts of lecithin and about 60 parts of cream. It is allowed to stand quietly after the preparation at a temperature of about from 12 to 15 degrees centigrade for from 12 to 14 hours, after which it will be found to contain a large quantity of aroma. It is not advisable to allow the emulsion to stand longer than from 12 to 14 hours because in such a case disagreeable smelling and tasting decomposition products will begin to be formed by the increased acid bacteria. The emulsion thus treated can be utilized for the complete flavoring of foods for instance artificial butter because it can be so intimately intermingled with the fat that every finest particle thereof is mingled with the addition.

What I claim is:

1. A process for the production of butter flavoring emulsion which consists in agitating a small quantity of cream with lecithin, adding successive portions of cream with vigorous agitation, and final ripening of the product at a temperature of from 12° to 15° centigrade.

2. A process for the production of butter flavoring emulsion which consists in adding gradually to lecithin small quantities of non-sterilized cream with prolonged vigorous agitation until a completely homogeneous emulsion is formed, and allowing to stand for from 12 to 14 hours at a temperature of from 12° to 15° centigrade.

3. A process for the production of lecithin butter flavoring emulsion which consists in mixing 100 parts of lecithin with 50 parts of fresh non-sterilized cream and agitating together for from 10 to 15 minutes, then adding further 50 parts of cream and again agitating from 10 to 15 minutes, then adding a third portion of from 50 to 75 parts of cream again agitating until a completely homogeneous emulsion has been formed, and finally allowing the preparation to stand for from 12 to 14 hours at a temperature of from 12° to 15° centigrade.

In testimony whereof I have signed my name to this specification in the presence of two subscribing witnesses.

HEINRICH CARL BUER.

Witnesses:
M. KNEPPERS,
D. VANDORY.